(12) United States Patent
Josephsen et al.

(10) Patent No.: US 10,073,677 B2
(45) Date of Patent: Sep. 11, 2018

(54) MIXED-RADIX CARRY-LOOKAHEAD ADDER ARCHITECTURE

(71) Applicant: Microsoft Technology Licensing, LLC, Redmond, WA (US)

(72) Inventors: Nathan Trent Josephsen, Halethorpe, MD (US); Steven Brian Shauck, Crofton, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 14/740,841

(22) Filed: Jun. 16, 2015

(65) Prior Publication Data

US 2016/0371058 A1 Dec. 22, 2016

(51) Int. Cl.
*G06F 7/508* (2006.01)
*G06F 7/501* (2006.01)

(52) U.S. Cl.
CPC .............. *G06F 7/508* (2013.01); *G06F 7/501* (2013.01)

(58) Field of Classification Search
CPC ...................................................... G06F 7/508
See application file for complete search history.

(56) References Cited

U.S. PATENT DOCUMENTS

| 5,233,551 A | 8/1993 | White |
| 5,473,556 A | 12/1995 | Aguilar et al. |
| 5,847,984 A | 12/1998 | Mahurin |
| 6,539,413 B1 | 3/2003 | Goldovsky et al. |
| 8,898,212 B2 | 11/2014 | Chen et al. |
| 2013/0124592 A1 | 5/2013 | Manohar et al. |

(Continued)

FOREIGN PATENT DOCUMENTS

EP 2144172 A1 1/2010

OTHER PUBLICATIONS

Oberg, Oliver Timothy ("Superconducting Logic Circuits Operating With Reciprocal Magnetic Flux Quanta", Publisher: University of Maryland, 2011).*

(Continued)

*Primary Examiner* — David H Malzahn
(74) *Attorney, Agent, or Firm* — Workman Nydegger

(57) ABSTRACT

Embodiments described herein are directed to mixed-radix carry-lookahead adders and methods performed thereby. The mixed-radix carry-lookahead adder includes an multiple carry-lookahead stages, where each stage may be of a different radix. Each stage operates on input bits, creating and implementing propagate and generate signals for each bit. The carry-lookahead stages also compute an XOR of the inputs that is forwarded to a final carry-lookahead stage. The elements of the initial and subsequent carry-lookahead stages are arranged such that each of the propagate and generate output signals passes through a minimal number of passive transmission lines. The final stage of the mixed-radix carry-lookahead adder includes an XOR logic gate configured to receive the generate output from an intermediate carry-lookahead stage and XOR the generate output received from the intermediate carry-lookahead stage with the computed XOR signal forwarded from the initial carry-lookahead stage to produce a sum of the input bits.

17 Claims, 6 Drawing Sheets

(56) References Cited

U.S. PATENT DOCUMENTS

2014/0006470 A1     1/2014    Rarick
2016/0371058 A1*   12/2016   Josephsen .............. G06F 7/508

OTHER PUBLICATIONS

Kameda et al. ("A New Design Methology for single-Flux-Quantum (SFQ) Logic Circuit Using Passive-Transmission-Line (PTL) Wiring" Published in: IEEE Transactions on Applied Supercondutivity, vol. 17, No. 2, on Jun. 2007).*

And He et al. ("A Power-Delay Efficient Hybrid Carry-Lookahead/Carry-Select Based Redundant Binary to Two's Complement Converter", published in IEEE Transactions on Circuits and Systems I: Regular Papers vol. 55, Issue: 1, on Mar. 14, 2008).*

Horowitz, mark ("Lecture 4 Adder", Apr. 13, 2007 https://web.stanford.edu/class/arch ive/ee371/ee371.1066/lectures/lect_04.2up.pdf).*

Houghton Mifflin Company ("The American Heritage college dictionary 4th edition" published by Houghton Mifflin Company, on 2004, ISBN 0-618-45300-8, pp. 884-885).*

Herr, et al., "An 8-bit Carry Look-Ahead Adder with 150 ps Latency and Sub-Microwatt Power Dissipation at 10GHz", In Journal of Applied Physics, vol. 113, Jan. 18, 2013, pp. 1-6.

Horowitz, M, "Adders", Retrieved on: Mar. 12, 2015 Available at: http://web.stanford.edu/class/archive/ee/ee371/ee371.1066/lectures/lect_04.2up.pdf.

Perri, et al., "Efficient Implementations of Radix-4 Parallel-Prefix Trees", In Proceedings of Fourth International Conference on Advances in Circuits, Electronics and Micro-Electronics, Aug. 21, 2011, pp. 1-5.

Zlatanovici, et al., "Power—Performance Optimal 64-Bit Carry-Lookahead Adders", In Proceedings of 29th European Solid-State Circuits Conference, Sep. 16, 2003, 4 pages.

Ramesh, et al., "Design of High Speed Hardware Efficient 4-Bit SFQ Multiplier", In International Journal of Advanced Research in Electrical, Electronics and Instrumentation Engineering, vol. 2, Issue 2, Feb. 2013, pp. 924-931.

Ercegovac, et al., "Effective Coding for Fast Redundant Adders using the Radix-2 Digit Set {0,1,2,3}", In Proceedings of Thirty-First Asilomar Conference on Signals, Systems & Computers, vol. 2, Nov. 2, 1997, pp. 1163-1167.

"Forecasting Superconductive Electronics Technology", In Proceedings of Next Wave, vol. 20, No. 3, Sep. 18, 2014, 9 pages.

Chung-Kuan Cheng, Computer Science and Engineering Depart. University of California, San Diego Design Space Exploration for Power-Efficient Mixed-Radix Ling Adders, (40 pages) http://cseweb.ucsd.edu/classes/wi10/cse241a/slides/arith_adder.ppt.

Lecture-4_Computer-Systems-Laboratory-Stanford-University (19 pages) 2006 http://web.stanford.edu/class/archive/ee/ee371/33371.1066/lectures/lect_04.2up.pdf.

Gurkaynak et al. "Higher Radix Kogge-Stone Parallel Prefix Adder Architectures" Circuits and Systems, 2000.

Horowitz "Adders—Lecture 4" EE 371 Lecture, Jan. 1, 2006.

Rani et al. "Delay Analysis of Parallel-Prefix Adders" International Journal of Science and Research, Jun. 1, 2014.

International Search Report and Written Opinion for PCT/US2016/037304 dated Sep. 1, 2016.

International Preliminary Report on Patentability issued in PCT application #PCT/US2016/037304 dated Feb. 10, 2017.

* cited by examiner

Initial Stage

Radix – 3 Element

US 10,073,677 B2

MIXED-RADIX CARRY-LOOKAHEAD ADDER ARCHITECTURE

BACKGROUND

Logic gates may be used to perform different forms of computation. For example, AND gates may provide known outputs to a specified set of inputs. The same is true for OR, XOR and other types of logic gates. These gates may then be combined to perform specific functions. In some cases, logic gates may be combined to form an adder. The adder may be able to take certain inputs and add them together to create a sum. As with addition on paper, some numbers or bits may need to be carried in order to obtain the proper sum. For very large numbers, multiple bits may need to be carried.

BRIEF SUMMARY

Embodiments described herein are directed to mixed-radix carry-lookahead adders and methods performed thereby. The carry-lookahead adder is referred to as a "mixed-radix" as its internal elements include carry-lookahead stages of at least two different radices. In one embodiment, a mixed-radix carry-lookahead adder is provided that includes an initial carry-lookahead stage having elements configured to receive input bits and create initial propagate and generate signals for each bit and to further compute an XOR of the inputs that is forwarded to a final carry-lookahead stage. The mixed-radix carry-lookahead adder further includes a first intermediate carry-lookahead stage having elements of a specified radix configured to receive the propagate and generate signals from the initial carry-lookahead stage and calculate its own propagate and generate output signals based thereon.

Still further, the mixed-radix carry-lookahead adder includes a second intermediate carry-lookahead stage having elements of a specified radix that is different than the radix of the first intermediate carry-lookahead stage. The second intermediate carry-lookahead stage is configured to receive the propagate and generate output signals from the first intermediate carry-lookahead stage and calculate its own generate output signal based thereon. The elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines. This arrangement of elements reduces latency within the adder. The mixed-radix carry-lookahead adder also includes a final carry-lookahead stage including an XOR logic gate configured to receive the generate output from the second intermediate carry-lookahead stage and XOR the generate output received from the second intermediate carry-lookahead stage with the computed XOR signal forwarded from the initial carry-lookahead stage to produce a sum of the input bits.

In another embodiment, a method is provided including the following: receiving, at an initial carry-lookahead stage having various elements, a plurality of input bits. The method next includes creating, at the initial carry-lookahead stage, initial propagate and generate signals for each bit and further compute an XOR of the inputs that is forwarded to a final carry-lookahead stage, receiving, at a first intermediate carry-lookahead stage having elements of a specified radix, the propagate and generate signals from the initial carry-lookahead stage, and calculating, at the first intermediate carry-lookahead stage, propagate and generate outputs based on the propagate and generate signals received from the initial carry-lookahead stage.

The method further includes receiving, at a second intermediate carry-lookahead stage having one or more elements of a specified radix that is different than the radix of the first intermediate carry-lookahead stage, the propagate and generate signals from the second intermediate carry-lookahead stage, and calculating, at the second intermediate carry-lookahead stage, a generate output signal based on the propagate and generate signals received from the first intermediate carry-lookahead stage. The elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines. Still further, the method includes receiving, at a final carry-lookahead stage comprising an XOR logic gate, the generate output from the second intermediate carry-lookahead stage and, at a final carry-lookahead stage, XORing the generate output received from the second intermediate carry-lookahead stage with the computed XOR signal forwarded from the initial carry-lookahead stage to produce a sum of the input bits.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
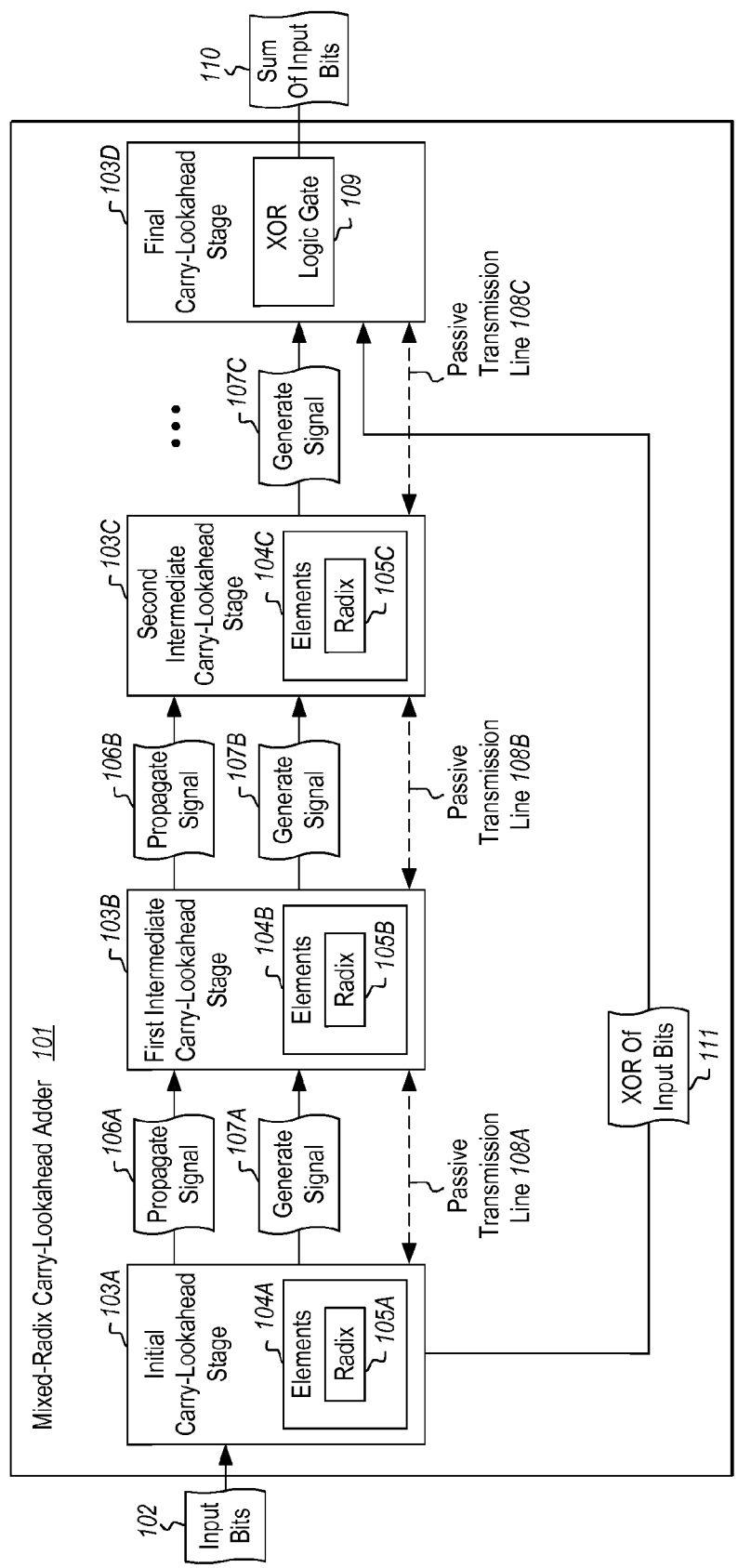
FIG. 1 illustrates an example embodiment of a mixed-radix carry-lookahead adder.

To reduce the computational time taken when performing a carrying operation when adding, various methods have been introduced including the carry-lookahead method. Many variations of carry-lookahead adders currently exist such as the Kogge-Stone carry-lookahead adder. These adders, however, often experience high latency depending on which radix is used and the number of necessary stages. The embodiments described herein are directed to mixed-radix carry-lookahead adders and methods performed thereby. In one embodiment, a mixed-radix carry-lookahead adder is provided that includes an initial carry-lookahead stage having elements configured to receive input bits and create initial propagate and generate signals for each bit and to further compute an XOR of the inputs that is forwarded to a final carry-lookahead stage. The mixed-radix carry-lookahead adder further includes a first intermediate carry-lookahead stage having elements of a specified radix configured to receive the propagate and generate signals from the initial carry-lookahead stage and calculate its own propagate and generate output signals based thereon.

Still further, the mixed-radix carry-lookahead adder includes a second intermediate carry-lookahead stage having elements of a specified radix that is different than the radix of the first intermediate carry-lookahead stage. The second intermediate carry-lookahead stage is configured to receive the propagate and generate output signals from the first intermediate carry-lookahead stage and calculate its own generate output signal based thereon. The elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines. This arrangement of elements reduces latency within the adder. The mixed-radix carry-lookahead adder also includes a final carry-lookahead stage including an XOR logic gate configured to receive the generate output from the second intermediate carry-lookahead stage and XOR the generate output received from the second intermediate carry-lookahead stage with the computed XOR signal forwarded from the initial carry-lookahead stage to produce a sum of the input bits.

In another embodiment, a method is provided including the following: receiving, at an initial carry-lookahead stage having various elements, a plurality of input bits. The method next includes creating, at the initial carry-lookahead stage, initial propagate and generate signals for each bit and further compute an XOR of the inputs that is forwarded to a final carry-lookahead stage, receiving, at a first intermediate carry-lookahead stage having elements of a specified radix, the propagate and generate signals from the initial carry-lookahead stage, and calculating, at the first intermediate carry-lookahead stage, propagate and generate outputs based on the propagate and generate signals received from the initial carry-lookahead stage.

The method further includes receiving, at a second intermediate carry-lookahead stage having one or more elements of a specified radix that is different than the radix of the first intermediate carry-lookahead stage, the propagate and generate signals from the second intermediate carry-lookahead stage, and calculating, at the second intermediate carry-lookahead stage, a generate output signal based on the propagate and generate signals received from the first intermediate carry-lookahead stage. The elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines. Still further, the method includes receiving, at a final carry-lookahead stage comprising an XOR logic gate, the generate output from the second intermediate carry-lookahead stage and, at a final carry-lookahead stage, XORing the generate output received from the second intermediate carry-lookahead stage with the computed XOR signal forwarded from the initial carry-lookahead stage to produce a sum of the input bits.

Embodiments described herein may be implemented in various types of processing hardware and/or various types of computing systems. The processing hardware may include programmable logic devices (PLDs), central processing units (CPUs), graphics processing units (GPUs), or other hardware or firmware electronic components. The computing systems in which embodiments may be implemented may include, for example, handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible hardware processor, and a physical and tangible hardware or firmware memory capable of having thereon computer-executable instructions that may be executed by the processor. A computing system may be distributed over a network environment and may include multiple constituent computing systems.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates an embodiment of a mixed-radix carry-lookahead adder 101. The mixed-radix carry-lookahead adder 101 is referred to as "mixed-radix" as it has at least two elements or components with different radices (e.g. a radix-2 element and a radix-3 element). The mixed-radix carry-lookahead adder 101 may be a Kogge-Stone adder or other type of adder. The mixed-radix carry-lookahead adder 101 (or "adder 101" herein) includes an initial stage 103A and a final stage 103D, with two or more intermediate stages.

In the embodiment shown in FIG. 1, the mixed-radix carry-lookahead adder 101 includes an initial carry-lookahead stage 103A, a first intermediate carry-lookahead stage 103B, a second intermediate carry-lookahead stage 103C, and a final carry-lookahead stage 103D. As indicated by the ellipses between the second intermediate stage and the final stage, more intermediate carry-lookahead stages may be implemented in different embodiments. Thus, while two intermediate stages are shown in FIG. 1, it will be recognized that many different intermediate carry-lookahead stages may be used.

The initial stage of the mixed-radix carry-lookahead adder 101 may be configured to receive input bits 102. The input bits 102 are to be summed by the adder 101. As a part of this summing process, the initial carry-lookahead stage 103A implements its logic elements 104A to generate a propagate signal 106A and a generate signal 107A. The propagate signal 106A and generate signal 107A are then transferred to the second intermediate carry-lookahead stage 103B. This is generally shown in FIG. 2.

Figure 2:
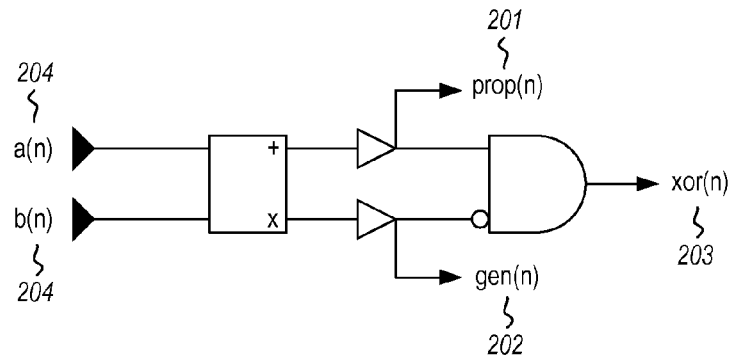
FIG. 2 illustrates an example initial stage element of a mixed-radix carry-lookahead adder.

FIG. 2 illustrates an embodiment of an initial stage that may be used in the mixed-radix carry-lookahead adder 101 of FIG. 1. As mentioned above, the adder 101 may be a Kogge-Stone carry-lookahead adder that combines features of different radices including, for example, a radix-2 and a radix-3 design. Kogge-Stone is an adder architecture that uses multiple stages of "generate-propagate" logic to calculate the carry input values to the final stage (e.g. 103D), which then calculates the result in a single step. The initial stage of the adder is made of logic blocks that may be arranged as shown in FIG. 2. The initial stage creates initial propagate signals 201 and generate signals 202 for each input bit 204, as well as an XOR 203 of the inputs that is forwarded to the final stage (103D). In some embodiments, a reciprocal quantum logic (RQL) ANDOR gate may be implemented in the initial stage. The ANDOR gate may allow the circuit of FIG. 2 to combine two functions into one gate, thereby reducing the physical size of the logic element, and also reducing latency of the electrical signals traveling through the adder.

Thus, the initial carry-lookahead stage 103A of FIG. 1 may include logic elements 104A that produce propagate and generate signals 106A and 107A, respectively. In some cases, the elements 104A of the initial stage may be of a given radix 105A, including a radix-2, radix-3 or other. In other cases, the elements of the initial stage do not have a radix of their own, but are configured to connect to the elements of the next stage (i.e. the first intermediate carry-lookahead stage 103B), whatever radix it may be. The propagate and generate signals may be sent to the first intermediate carry-lookahead stage 103B via transmission lines including, perhaps, passive transmission line 108A. Indeed, as will be explained further later, the logic elements 104A of the initial carry-lookahead stage 103A may be arranged such that each of the propagate and generate output signals 106A and 107A passes through a minimal number of passive transmission lines (e.g. 108A). In some cases, the minimal number of passive transmission lines is one, while in other cases, a propagate or generate signal may pass through more than one passive transmission line. Arranging the logic elements in this manner reduces latency within the adder 101.

Figure 3:
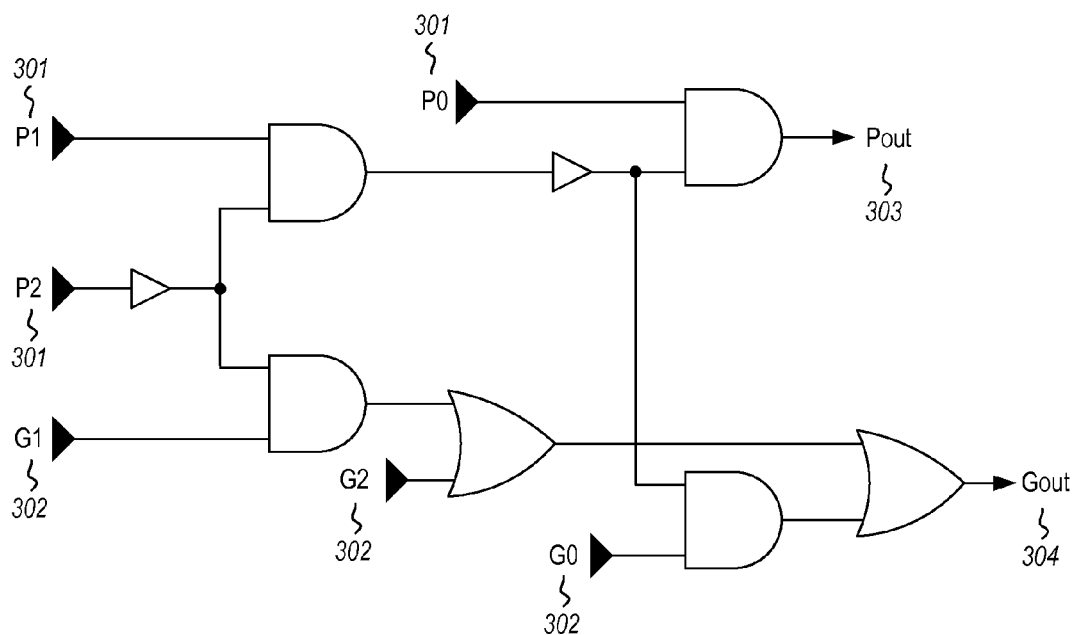
FIG. 3 illustrates an example Radix-3 intermediate stage element of a mixed-radix carry-lookahead adder.

The mixed-radix carry-lookahead adder 101 of FIG. 1 further includes a first intermediate carry-lookahead stage 103B, with its own logic elements 104B having a specified radix 105B. In one example embodiment, the first intermediate stage 103B may be a radix-3 element, as shown in FIG. 3. The radix-3 logic element of FIG. 3 receives three propagate inputs 301 and three generate inputs 302 to calculate its own propagate output 303 and generate output 304. Thus, as shown in FIG. 1, the first intermediate stage 103B may produce and send propagate signal 106B and generate signal 107B to the second intermediate carry-lookahead stage. As with the initial stage 103A, the first intermediate stage's logic elements 104B may be arranged such that each of the propagate and generate output signals 106B and 107B passes through a minimal number of passive transmission lines (e.g. 108B). When the logic elements are arranged in this manner, latency within the adder 101 may be further reduced.

Figure 4:
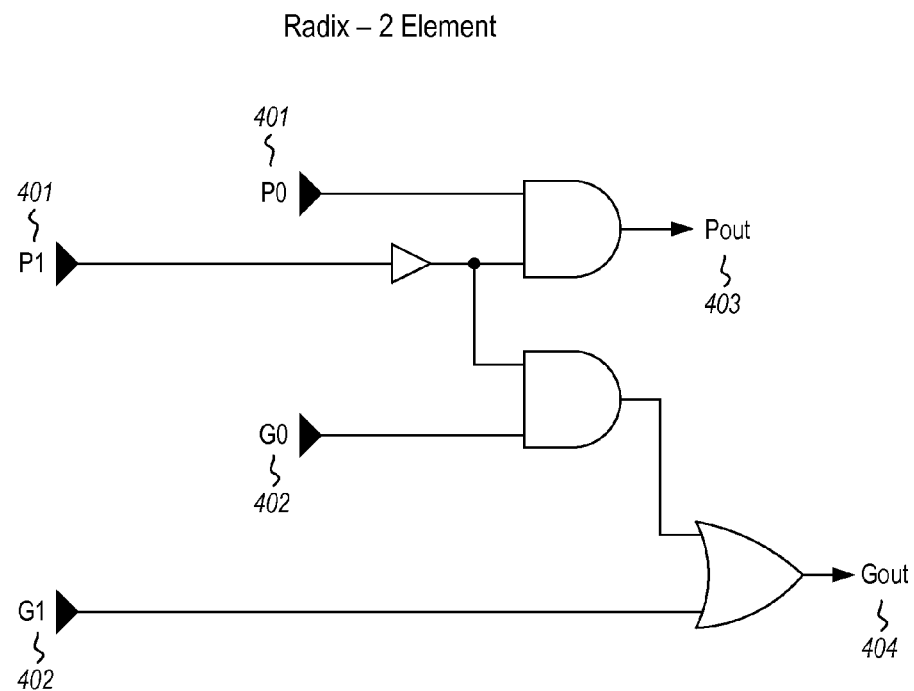
FIG. 4 illustrates an example Radix-2 intermediate stage element of a mixed-radix carry-lookahead adder.

Continuing on, the second intermediate carry-lookahead stage 103C, like the first and initial stages, may have logic elements 104 of a specified radix 105C. As the adder 101 is a mixed-radix adder, the radix 105C of the second intermediate stage 103C will be different than the radix 105B of the first intermediate stage 103B. FIG. 4 illustrates an embodiment of a radix-2 logic element. It is similar in principle to the radix-3 element of FIG. 3, but takes only four inputs (two propagate inputs 401 and two generate inputs 402). Using these inputs, it generates a propagate output signal 403 and a generate output signal 404 in cases where the adder includes further intermediate stages.

In cases where the second intermediate stage 103C is the last intermediate stage before the final stage 103D, then the second intermediate stage will only produce a generate output 107C. In addition to the elements shown in FIG. 4, variants may be implemented that cannot propagate a carry signal. These elements may be used for the least significant bits in each stage. This allows the AND gate that calculates the propagate signal to be omitted from the logic element. Still further, as with the initial and first intermediate stages, the second stage's logic elements 104C may be arranged to pass a signal through a minimal number of passive transmission lines including, for example, only passive transmission line 108C.

Figure 5:
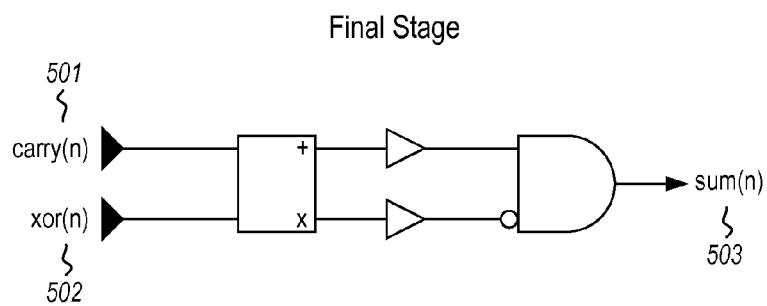
FIG. 5 illustrates an example final stage element of a mixed-radix carry-lookahead adder.

The final carry-lookahead stage 103D of FIG. 1 includes an XOR logic gate 109 that is configured to receive the generate signal 107C from the second intermediate stage 103C, as well as an XOR of the input bits 111 sent from the initial stage 103A. The final stage, an embodiment of which is shown in FIG. 5, takes the received generate signal 501 (signal 107C of FIG. 1), which is the final carry, from the previous stage (i.e. 103C) and XORs it with the XORed input bits 502 from the initial stage 103A to produce the final output 503. This final logic block may also use an RQL ANDOR gate to reduce the size and latency of its logic elements.

Figure 6:
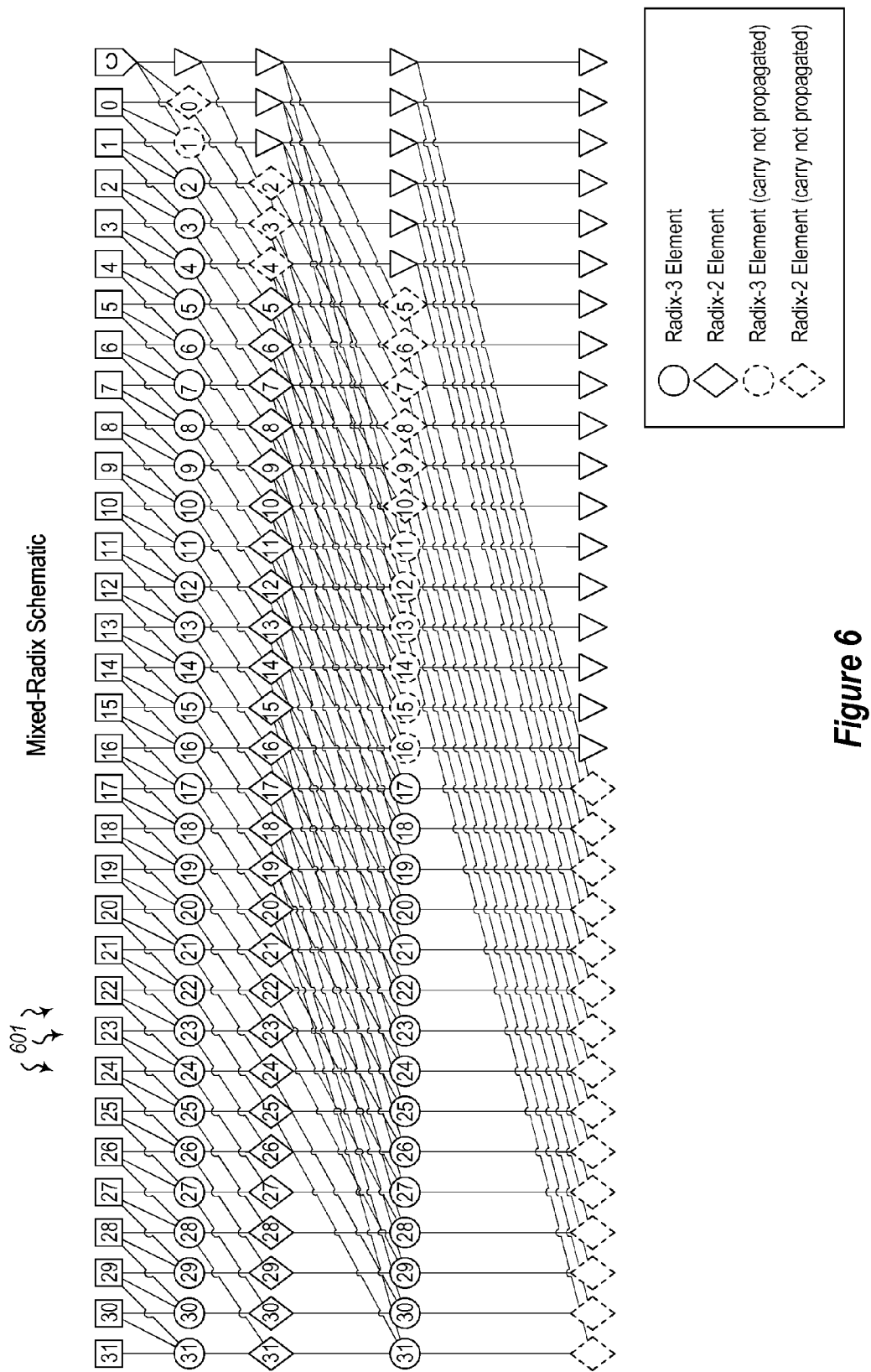
FIG. 6 illustrates a schematic wire diagram of a mixed-radix carry-lookahead adder.

FIG. 6 illustrates a high level block diagram of a mixed-radix carry-lookahead adder 601. The adder 601 includes an initial stage and four intermediate stages. The adder 601 may thus be similar to the adder 101 of FIG. 1, but includes two additional intermediate stages. The initial stage and first and second intermediate stages may be similar to or include the same elements as those shown in FIGS. 2-5, respectively. The adder 601 may be arranged in a 3-2-3-2 mixed-radix pattern. The initial stage of the adder 601 calculates initial propagate and generate signals, which percolate through the second through fifth stages. The fifth stage (i.e. the fourth intermediate stage) has no propagate output, but its generated outputs become the carries that are fed into the XOR gate in the final stage. The five stages are shown horizontally, each having bits 0-31. It will be understood that while a 32-bit adder is shown herein, other smaller or larger adders are contemplated herein.

In FIG. 6, as indicated in the key, solid-line circles are radix-3 elements and solid-line diamonds are radix-2 elements. Elements that do not produce a propagate signal (and thus have one fewer output and one fewer input) are drawn in dotted lines. As such, in FIG. 6, element 1 of the first stage and elements 11-16 of the fourth stage, shown in dotted-line circles, are radix-3 elements that do not propagate a carry signal. Similarly, element 0 of the second stage, elements 2-4 of the third stage, elements 5-10 of the fourth stage, and elements 17-31 of the fifth stage are shown in dotted-line diamonds, indicating that they are radix-2 elements that do not propagate a carry signal. The other solid-lined elements produce both propagate and generate signals at their respective stages.

Figure 7:
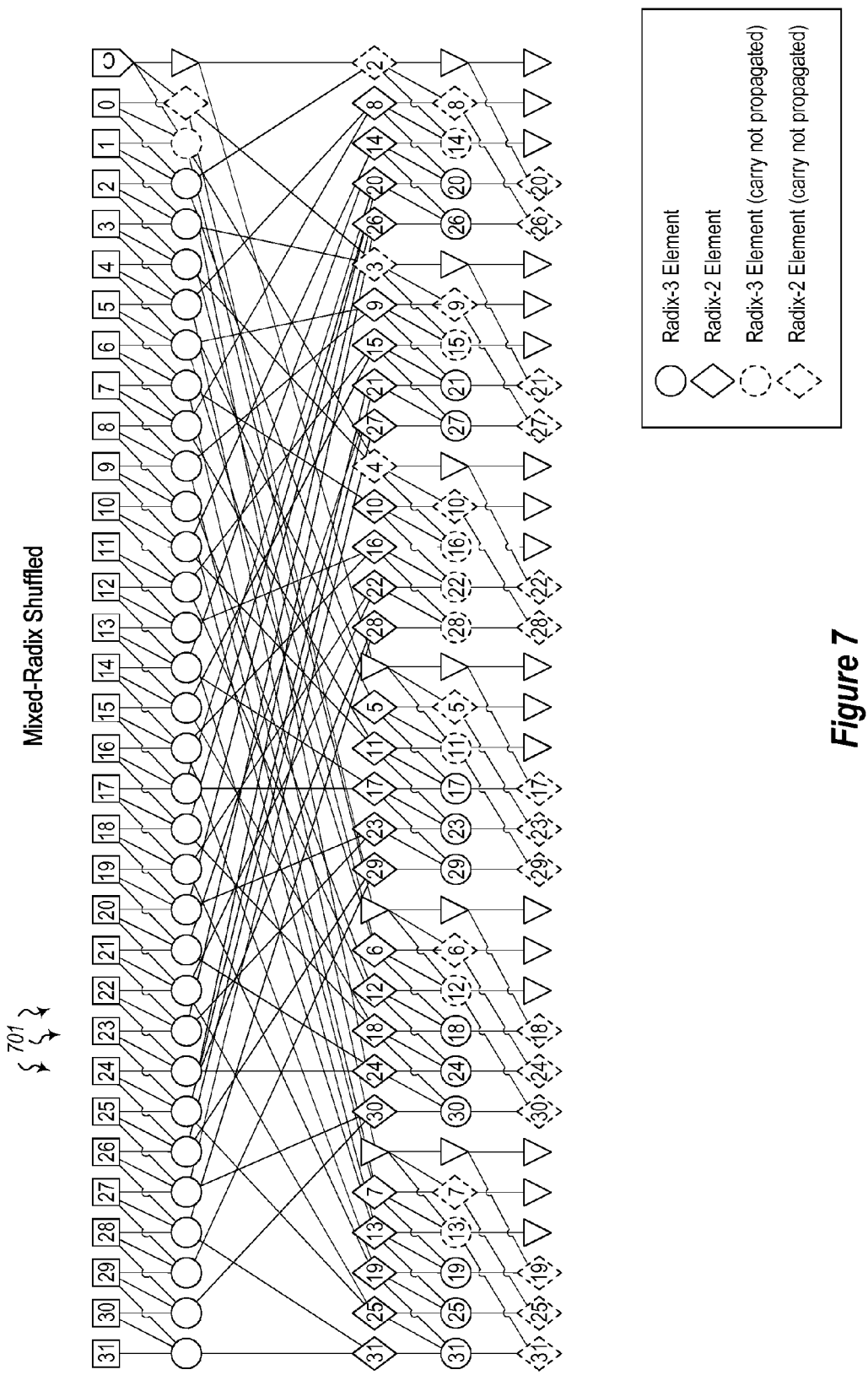
FIG. 7 illustrates an alternative schematic wire diagram of a mixed-radix carry-lookahead adder.

The adder 601 has multiple long wires connecting distant elements. Each of these long wires may need to become a passive transmission line (PTL) during the summing process. For example, this may occur in reciprocal quantum logic. Using a PTL may cause the adder 601 to incur a high latency penalty. A critical path (i.e. an electronic path through the adder 601 that must be traveled by one or more bits) may incur further latency if it has to travel through two or possibly three of these long wires. In the embodiments herein, logic elements may be reordered in stages 3, 4, and 5, to increase the likelihood that each signal needs to go through only one passive transmission line, reducing latency overall. Embodiments with reordered logic elements, as shown in FIG. 7, have shorter wires between stages 3 and 5 at the expense of more PTLs between stages 2 and 3. Since no signal has to go through more than one long wire, this incurs no additional penalty.

These same techniques may be applied to smaller or larger adders. The 32-bit adder 701 of FIG. 7 has four carry-lookahead stages in a 3-2-3-2 configuration. Alternatively, it may have two carry-lookahead stages of radix-6, of which the first carry-lookahead stage is divided by one or more passive transmission lines. The adder 701 shows an example embodiment in which logic elements of the various stages are reordered or rearranged to ensure that each signal passes through no more than a single PTL. A 64-bit adder (effectively 65 with carry-in and carry-out) may have a 3-2-3-2-2 configuration, with one additional radix-2 stage on the output. Such an adder may implement an additional set of passive transmission lines between the second radix-3 and the second radix-2 stages. The final radix-2 stage may then be rearranged as in FIG. 7 to make further PTLs unnecessary. Other sizes may also be used using this approach, particularly when the size of the adder is slightly more than an exact power of two.

Embodiments described herein may thus combine radix-2 and radix-3 stages to make a radix-6 stage. Each radix-6 stage is small enough that it can be routed without the use of passive transmission lines. The radix-6 stages can be placed so that all long routes occur at only one level when implementing a 32-bit adder. This is beneficial in RQL performance due to the overhead of using a passive transmission line. The combination of radix-2 and radix-3 stages allows each critical path to have the same number of PTLs. In this manner, the number of passive transmission lines may be balanced among the possible paths through the adder 701, so that each critical path crosses only one passive transmission line. At least in some cases, this may greatly reduce the latency in an RQL design. These concepts will be explained further below with regard to method 800 of FIG. 8.

Figure 8:
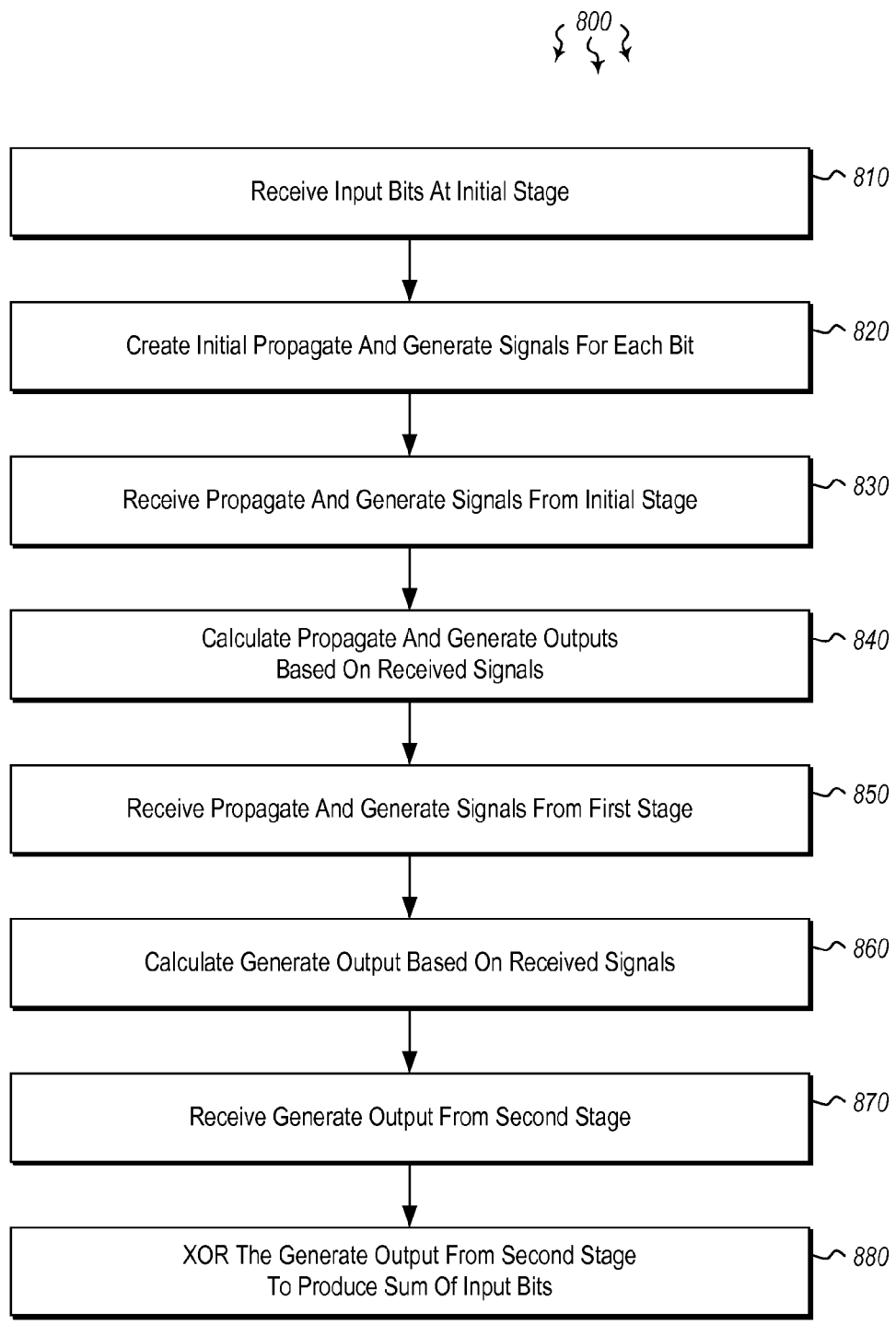
FIG. 8 illustrates a flowchart of an example method performed by a mixed-radix carry-lookahead adder for determining the sum of two or more input bits.

In view of the systems and architectures described above, methodologies that may be implemented in accordance with the disclosed subject matter will be better appreciated with reference to the flow chart of FIG. 8. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 illustrates a flowchart of a method 800 performed by a mixed radix carry-lookahead adder. The method 800 will now be described with frequent reference to the components and data of environment 100 of FIG. 1.

Method 800 includes receiving, at an initial carry-lookahead stage having one or more elements, a plurality of input bits (Block 810). For example, the initial carry-lookahead stage 103A of the mixed-radix carry-lookahead adder 101 may receive input bits 102. The mixed-radix carry-lookahead adder 101 includes carry-lookahead stages of at least two different radices. The initial carry-lookahead stage 103A may further create initial propagate signal 106A and generate signal 107A for each bit and further compute an XOR of the inputs that is forwarded to a final carry-lookahead stage (Block 820).

The mixed-radix carry-lookahead adder 101 may further include a first intermediate carry-lookahead stage 103B having elements 104B of a specified radix 105B. The first intermediate stage 103B may be configured to receive the propagate signal 106A and generate signal 107A from the initial carry-lookahead stage 103A (Block 830) and calculate its own propagate output signal 106B and generate output signal 107B based thereon (Block 840). The propagate signal 106A and generate signal 107A may be transmitted over the same or different transmission lines, and may be transmitted over passive transmission line 108A. Similarly, the propagate signal 106B and generate signal 107B generated by the first intermediate stage 103B may be transmitted over the same or different transmission lines, and may be transmitted over passive transmission line 108B.

The mixed-radix carry-lookahead adder may further include a second intermediate carry-lookahead stage having elements 104C of a specified radix 105C that is different than the radix 105B of the first intermediate carry-lookahead stage 103B. The second intermediate carry-lookahead stage 103C is configured to receive the propagate output signal 106B and generate output signal 107B from the first intermediate carry-lookahead stage 103B (Block 850) and calculate its own generate output signal 107C based thereon (Block 860).

At least in some embodiments, the elements 104A of the initial carry-lookahead stage 103A, the elements 104B of the first intermediate carry-lookahead stage 103B, and the elements 104C of the second intermediate carry-lookahead stage 103C may be arranged such that each of the propagate output and generate output signals generated at these stages passes through a minimal number of passive transmission lines. This arrangement of elements reduces latency and complexity within the adder 101. By ensuring that critical paths for the propagate and generate signals only include, for example, one passive transmission line, latency in the adder can be reduced.

The mixed-radix carry-lookahead adder also includes a final carry-lookahead stage 103D including an XOR logic gate 109 configured to receive the generate output from the second intermediate carry-lookahead stage (Block 870) and XOR the generate output 107C received from the second intermediate carry-lookahead stage 103C with the computed XOR signal 111 forwarded from the initial carry-lookahead stage to produce a sum 110 of the input bits 102 (Block 880). In some embodiments, the first intermediate carry-lookahead stage is radix-3, while the second intermediate carry-lookahead stage is radix-2. In other cases, the first intermediate carry-lookahead stage is radix-6, while the second intermediate carry-lookahead stage is radix-6. In such cases, the initial carry-lookahead stage would have a radix that is the same as that of the first intermediate stage.

In some cases, the mixed-radix carry-lookahead adder 101 may include multiple intermediate stages. For example, the adder 101 may include a radix 3-4-3 combination, or a 3-2-3-2 combination or some other mixture of intermediate stages. For instance, in one embodiment, the second intermediate stage 103C produces both a propagate signal and a generate signal. In this embodiment, the adder 101 may include a third intermediate carry-lookahead stage having a specified radix configured to receive propagate and generate signals from the second carry-lookahead stage and calculate its own propagate or generate outputs based thereon.

The adder 101 may also include a fourth intermediate carry-lookahead stage having a specified radix that is different than the radix of the third intermediate carry-lookahead stage, configured to receive the propagate and generate signals from the third intermediate carry-lookahead stage and calculate its own generate output based thereon. This generate output signal is then passed to the final carry-lookahead stage 103D. In this embodiment, the first intermediate carry-lookahead stage may be radix-3, while the second intermediate carry-lookahead stage is radix-2, the third intermediate carry-lookahead stage is radix-3 and the fourth intermediate carry-lookahead stage is radix-2.

In another embodiment, the adder 101 may include the four stages shown in FIG. 1 (i.e. 103A-103D), and may further include a third intermediate carry-lookahead stage having a specified radix configured to receive propagate and generate signals from the second carry-lookahead stage and calculate its own propagate or generate outputs based thereon. In such cases, the first intermediate carry-lookahead stage may be radix-3, the second intermediate carry-lookahead stage may be radix-4, and the third intermediate carry-lookahead stage may be radix-3. Many other combinations are possible.

In each of the above-described embodiments, regardless of the number of intermediate stages used, the passive transmission lines used in the adder 101 may be balanced among possible paths through the adder. The balanced passive transmission lines may ensure that each critical path crosses only a single passive transmission line, thereby reducing transmission latency for the transmission of the various signals through the adder. Arranging the elements of the second intermediate carry-lookahead stage such that each of the propagate and generate output signals passes through a minimal number of passive transmission lines may include physically aligning one or more bits of the mixed-radix carry-lookahead adder. Indeed, physical electrical routes through the logic elements may be aligned so that the generated output signals will only pass through a single PTL (or through no PTLs).

The mixed-radix carry-lookahead adder 101 of FIG. 1 may further be configured to process sums using reciprocal quantum logic (RQL). In some cases, the adder 101 may implement a RQL ANDOR gate in the initial carry-lookahead stage to create both the initial propagate and generate signals for each input bit 102 and the XOR of the inputs 111 in a single logic gate.

A mixed-radix carry-lookahead adder 101 is provided. The adder 101 includes the following: an initial carry-lookahead stage 103A having one or more elements 104A configured to receive a plurality of input bits 102 and create initial propagate 106A and generate 107A signals for each bit and further compute an XOR 111 of the inputs that is forwarded to a final carry-lookahead stage 103D and a first intermediate carry-lookahead stage 103B having one or more elements 104B of a specified radix 105B configured to receive the propagate and generate signals from the initial carry-lookahead stage and calculate its own propagate 106B and generate 107B output signals based thereon.

The mixed-radix carry-lookahead adder also includes a second intermediate carry-lookahead stage 103C having one or more elements 104C of a specified radix 105C that is different than the radix of the first intermediate carry-lookahead stage, configured to receive the propagate and generate output signals from the first intermediate carry-lookahead stage and calculate its own generate output signal 107C based thereon, wherein the elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines 108A, a final carry-lookahead stage comprising an XOR logic gate 109 configured to receive the generate output from the second intermediate carry-lookahead stage and XOR the generate output received from the second intermediate carry-lookahead stage with the computed XOR signal forwarded from the initial carry-lookahead stage to produce a sum 110 of the plurality of input bits.

In some cases, the first intermediate carry-lookahead stage is radix-3, and the second intermediate carry-lookahead stage is radix-2. The second intermediate carry-lookahead stage calculates propagate and generate signals, and the adder includes a third intermediate carry-lookahead stage having a specified radix configured to receive propagate and generate signals from the second carry-lookahead stage and calculate its own propagate or generate outputs based thereon, and a fourth intermediate carry-lookahead stage having a specified radix that is different than the radix of the third intermediate carry-lookahead stage, configured to receive the propagate and generate signals from the third intermediate carry-lookahead stage and calculate its own generate output based thereon.

In some cases, the first intermediate carry-lookahead stage is radix-3, the second intermediate carry-lookahead stage is radix-2, the third intermediate carry-lookahead stage is radix-3 and the fourth intermediate carry-lookahead stage is radix-2. In other cases, the first intermediate carry-lookahead stage is radix-6, the second intermediate carry-lookahead stage is radix-6. A third intermediate carry-lookahead stage may be included that has a specified radix configured to receive propagate and generate signals from the second carry-lookahead stage and calculate its own propagate or generate outputs based thereon. Passive transmission lines are balanced among possible paths through the mixed-radix carry-lookahead adder. The mixed-radix carry-lookahead adder includes at least one critical path through which one or more bits must flow, and the balanced passive transmission lines ensure that each critical path crosses only a single passive transmission line. The mixed-radix carry-lookahead adder is also configured to process sums using reciprocal quantum logic (RQL).

In another embodiment, a method is performed by a mixed-radix carry-lookahead adder. The method includes: receiving, at an initial carry-lookahead stage 103A having one or more elements 104A, a plurality of input bits 102, creating, at the initial carry-lookahead stage, initial propagate 106A and generate 107A signals for each bit and further compute an XOR 111 of the inputs that is forwarded to a final carry-lookahead stage 103D, receiving, at a first intermediate carry-lookahead stage 103B having one or more elements 104B of a specified radix 105B, the propagate and generate signals from the initial carry-lookahead stage, calculating, at the first intermediate carry-lookahead stage, propagate and generate outputs based on the propagate and generate signals received from the initial carry-lookahead stage, receiving, at a second intermediate carry-lookahead stage 103C having one or more elements 104C of a specified radix 105C that is different than the radix of the first intermediate carry-lookahead stage, the propagate and generate signals from the first intermediate carry-lookahead stage.

The method further includes calculating, at the second intermediate carry-lookahead stage, a generate output signal 107C based on the propagate and generate signals received from the first intermediate carry-lookahead stage, wherein the elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines 108A, receiving, at a final carry-lookahead stage comprising an XOR logic gate 109, the generate output from the second intermediate carry-lookahead stage and, at a final carry-lookahead stage, XORing the generate output received from the second intermediate carry-lookahead stage with the computed XOR signal forwarded from the initial carry-lookahead stage to produce a sum 110 of the plurality of input bits.

The method further includes, in cases where the second intermediate carry-lookahead stage calculates propagate and generate signals, receiving, at a third intermediate carry-lookahead stage having one or more elements of a specified radix, the propagate and generate signals from the second carry-lookahead stage, calculating, at the third intermediate carry-lookahead stage, propagate and generate outputs based on the propagate and generate signals received from the second carry-lookahead stage, receiving, at a fourth intermediate carry-lookahead stage having one or more elements of a specified radix, the propagate and generate signals from the third carry-lookahead stage; and calculating, at the fourth intermediate carry-lookahead stage, generate outputs based on the propagate and generate signals received from the third carry-lookahead stage.

In some cases, the first intermediate carry-lookahead stage is radix-3, the second intermediate carry-lookahead stage is radix-2, the third intermediate carry-lookahead stage is radix-3 and the fourth intermediate carry-lookahead stage is radix-2. In cases where the second intermediate carry-lookahead stage calculates propagate and generate signals, the method further includes receiving, at a third intermediate carry-lookahead stage having one or more elements of a specified radix, the propagate and generate signals from the second carry-lookahead stage and calculating, at the third intermediate carry-lookahead stage, propagate and generate outputs based on the propagate and generate signals received from the second carry-lookahead stage, wherein the first intermediate carry-lookahead stage is radix-3, the second intermediate carry-lookahead stage is radix-4, and the third intermediate carry-lookahead stage is radix-3.

In another embodiment, a mixed-radix carry-lookahead adder is provided. The adder includes the following: an initial carry-lookahead stage 103A configured to receive a plurality of input bits 102 and create initial propagate 106A and generate 107A signals for each bit and further compute an XOR 111 of the inputs that is forwarded to a final carry-lookahead stage 103D, a first intermediate carry-lookahead stage 103B having a radix-3 configuration which receives the propagate and generate signals from the initial carry-lookahead stage and calculates its own propagate 106B and generate 107B outputs based thereon, a second intermediate carry-lookahead stage 103C having a radix-2 configuration which receives the propagate and generate signals from the second intermediate carry-lookahead stage and calculates its own propagate and generate 107C outputs based thereon.

The adder further includes a third intermediate carry-lookahead stage having a radix-3 configuration which receives the propagate and generate signals from the second carry-lookahead stage and calculates its own propagate and generate outputs based thereon, a fourth intermediate carry-lookahead stage having a radix-2 configuration which receives the propagate and generate signals from the second intermediate carry-lookahead stage and calculates its own generate output based thereon, a final carry-lookahead stage comprising an XOR logic gate 109 configured to receive the generate output from the second intermediate carry-lookahead stage and XOR the generate output received from the second intermediate carry-lookahead stage with the computed XOR signal forwarded from the initial carry-lookahead stage to produce a sum 110 of the plurality of input bits. The elements of the initial carry-lookahead stage, the elements of the first intermediate carry-lookahead stage, and the elements of the second intermediate carry-lookahead stage are arranged such that each of the propagate and generate output signals passes through a minimal number of passive transmission lines.

Accordingly, in this manner, a mixed-radix carry-lookahead adder 101 may be provided. The adder 101 may include multiple different stages, where the logic elements of the various stages are arranged such that propagate and generate output signals pass through a minimal number of passive transmission line. This may reduce complexity and latency within the adder.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A mixed-radix carry-lookahead adder, comprising the following:

an initial carry-lookahead stage having one or more elements configured to receive a plurality of sets of input bits, to create initial propagate and generate output signals for each bit position in the sets of input bits, and to compute an XOR of the sets of input bits that is forwarded to a final carry-lookahead stage;

a first intermediate carry-lookahead stage having one or more elements of a first radix, and that is configured to receive the initial propagate and generate output signals from the initial carry-lookahead stage, and to calculate first propagate and generate output signals based thereon;

a second intermediate carry-lookahead stage having one or more elements of a second radix that is different than the first radix, and that is configured to receive the first propagate and generate output signals from the first intermediate carry-lookahead stage and calculate second propagate and generate output signals based thereon;

a third intermediate carry-lookahead stage having one or more elements of the first radix and one or more elements of the second radix, and that is configured to receive the second propagate and generate output signals from the second intermediate carry-lookahead stage and calculate at least a third generate output signal based thereon, wherein the elements of the initial carry-lookahead stage, the elements of the first intermediate carry-lookahead stage, the elements of the second intermediate carry-lookahead stage, and the elements of the third intermediate carry-lookahead stage are arranged such that each of the propagate and generate output signals passes through no more than a single passive transmission line; and the final carry-lookahead stage comprising an XOR logic gate configured to receive a final generate output signal from an intermediate carry-lookahead stage, and to XOR the final generate output signal with the computed XOR signal forwarded from the initial carry-lookahead stage in order to produce a sum of the plurality of sets of input bits.

2. The mixed-radix carry-lookahead adder of claim 1, wherein the first intermediate carry-lookahead stage is radix-3, and the second intermediate carry-lookahead stage is radix-2.

3. The mixed-radix carry-lookahead adder of claim 1, wherein the first intermediate carry-lookahead stage is radix-3, the second intermediate carry-lookahead stage is radix-2, and the third intermediate carry-lookahead stage includes radix-3 and radix-2 elements.

4. The mixed-radix carry-lookahead adder of claim 1, the intermediate carry-lookahead state comprising a fourth intermediate carry-lookahead stage having a specified radix configured to receive propagate and generate signals from the third carry-lookahead stage and calculate the final generate output signal based thereon.

5. The mixed-radix carry-lookahead adder of claim 1, wherein passive transmission lines are balanced among possible paths through the mixed-radix carry-lookahead adder.

6. The mixed-radix carry-lookahead adder of claim 5, wherein the mixed-radix carry-lookahead adder includes at least one critical path through which one or more bits must flow, and wherein the balanced passive transmission lines ensure that each critical path crosses only a single passive transmission line.

7. The mixed-radix carry-lookahead adder of claim 1, wherein the mixed-radix carry-lookahead adder is configured to process sums using reciprocal quantum logic (RQL).

8. The mixed-radix carry-lookahead adder of claim 7, wherein the mixed-radix carry-lookahead adder implements an RQL ANDOR gate in the initial carry-lookahead stage to create both the initial propagate and generate signals for each bit position in the sets of input bits and the XOR of the sets of input bits in a single logic gate.

9. The mixed-radix carry-lookahead adder of claim 1, wherein the third generate output signal comprises the final generate output signal.

10. A method performed by a mixed-radix carry-lookahead adder, the method comprising:

receiving, at an initial carry-lookahead stage having one or more elements, a plurality of sets of input bits;
creating, at the initial carry-lookahead stage, initial propagate and generate signals for each bit position in the sets of input bits and further computing an XOR of the sets of input bits that is forwarded to a final carry-lookahead stage;

receiving, at a first intermediate carry-lookahead stage having one or more elements of a first radix, the propagate and generate signals from the initial carry-lookahead stage;

calculating, at the first intermediate carry-lookahead stage, first propagate and generate signals based on the initial propagate and generate signals received from the initial carry-lookahead stage;

receiving, at a second intermediate carry-lookahead stage having one or more elements of a second radix that is different than the first radix of the first intermediate carry-lookahead stage, the first propagate and generate signals from the first intermediate carry-lookahead stage;

calculating, at the second intermediate carry-lookahead stage, second propagate and generate signals based on the first propagate and generate signals received from the first intermediate carry-lookahead stage;

receiving, at a third intermediate carry-lookahead stage having one or more elements of the first radix and one or more elements of the second radix, the second propagate and generate signals from the second intermediate carry-lookahead stage;

calculating, at the third intermediate carry-lookahead stage, at least a third generate signal based on the second propagate and generate signals received from the second intermediate carry-lookahead stage, wherein the elements of the initial carry-lookahead stage, the elements of the first intermediate carry-lookahead stage, the elements of the second intermediate carry-lookahead stage, and the elements of the third intermediate carry-lookahead stage are arranged such that each of the propagate and generate signals passes through no more than a single passive transmission line;

receiving, at all the final carry-lookahead stage comprising an XOR logic gate, a final generate signal from an intermediate carry-lookahead stage; and at all the final carry-lookahead stage, XORing the final generate signal with the computed XOR signal forwarded from the initial carry-lookahead stage in order to produce a sum of the plurality of sets of input bits.

11. The method of claim 10, wherein the first intermediate carry-lookahead stage is radix-3, and the second intermediate carry-lookahead stage is radix-2.

12. The method of claim 10, wherein the first intermediate carry-lookahead stage is radix-3, the second intermediate carry-lookahead stage is radix-2, and the third intermediate carry-lookahead stage includes radix-3 and radix-2 elements.

13. The method of claim 10, wherein the third generate output signal comprises the final generate output signal.

14. The method of claim 10, wherein passive transmission lines are balanced among possible paths through the mixed-radix carry-lookahead adder.

15. The method of claim 14, wherein the mixed-radix carry-lookahead adder includes at least one critical path through which one or more bits must flow, and wherein the balanced passive transmission lines ensure that each critical path crosses only a single passive transmission line.

16. The method of claim 10, wherein the mixed-radix carry-lookahead adder is configured to process sums using reciprocal quantum logic (RQL).

17. The method of claim 16, wherein the mixed-radix carry-lookahead adder implements an RQL ANDOR gate in the initial carry-lookahead stage to create both the initial propagate and generate signals for each bit position in the sets of input bits and the XOR of the sets of input bits in a single logic gate.

* * * * *